Aug. 12, 1947.　　　J. P. JOHNSON　　　2,425,539
COUPLING
Filed Oct. 31, 1942

INVENTOR.
JAMES P. JOHNSON
BY

Patented Aug. 12, 1947

2,425,539

UNITED STATES PATENT OFFICE 2,425,539

COUPLING

James P. Johnson, Shaker Heights, Ohio, assignor to The Aro Equipment Corporation, a corporation of Ohio Application October 31, 1942, Serial No. 464,102

4 Claims. (Cl. 64—27)

This invention relates to couplings and has for its primary object to provide a flexible coupling unit of improved construction adapted to drivingly connect a drive member and a driven member in such a manner that impulses and vibrations ordinarily transmitted therebetween are effectively absorbed to such an extent that fatigue is eliminated or materially reduced as well as breakage ordinarily due to crystallization of the elements.

A further object of the present invention is to provide a coupling of the type referred to in which the relatively movable elements are so mounted for such movement as to materially increase its efficiency.

Another object of the present invention resides in an improved construction effecting better balancing of the coupling so that a more uniform distribution of the load is provided which eliminates or materially reduces wear to a minimum.

Another object of the present invention is to provide torque actuated spring members disposed for relative operation 180° apart and so formed that relatively different pressures are required in their actuation to obtain a balanced load on the driving and driven members.

Another object of the present invention is to provide a flexible coupling unit which is simple in construction, efficient in operation, and inexpensive to manufacture and assemble.

With the objects above indicated, and other objects hereinafter explained in view, my invention consists in the construction and combination of elements hereinafter described and claimed.

Referring to the drawings.

Figure 1:
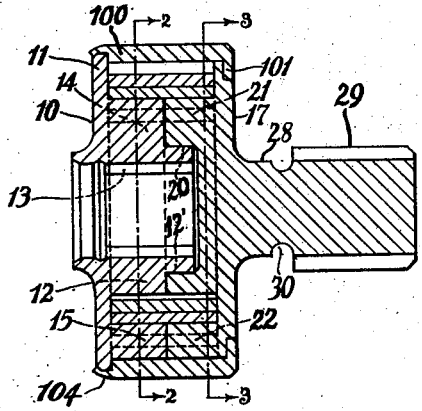
Figure 1 is a longitudinal vertical sectional view taken substantially along line 1—1 in Figure 2 and showing a coupling embodying the present invention.

In the drawings I have illustrated a flexible coupling embodying the present invention and while particularly designed for use in connection with vacuum pumps for aircraft, it will be obvious that the coupling may be otherwise adapted under conditions where similar results are desired.

Figure 4:
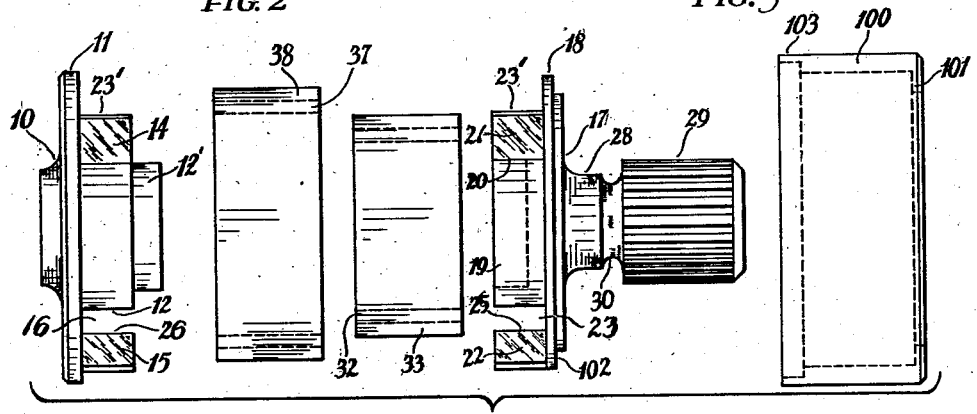
Figure 4 is a longitudinal side elevational view with the elements in extended spaced relation in their manner of assembly.

The coupling is preferably a self-contained unit comprising a driven member 10, of steel or similar material, having a circular flange 11 at its outer end and a centrally disposed hub portion 12 projecting axially inwardly from the latter, the extreme free end 12' being of reduced diameter for a purpose to be later described. The flange 11 and hub portion 12 are provided with internal splines 13 which extend longitudinally throughout their combined lengths, as more clearly shown in Figure 1 and for a purpose to be later described. The driven member 10 is further provided with a pair of integral lugs 14 and 15, the former projecting outwardly from the flange 11 but terminating short of the free end of the hub. The lug 15 is disposed diametrically opposite to the lug 14 but further outward radially in spaced relation to the hub to provide a slot 16 as best shown in Fig. 4 and projects inwardly from the flange the same distance as the lug 14, their end faces being in a common plane perpendicular to the axis of the hub portion.

A drive member 17, of steel or other suitable material, comprises a circular flange 18 at its outer end and centrally disposed hub portion 19, of the same diameter as the hub portion 12, projects axially inwardly from the flange 18, into engagement with the hub portion 12. The inner end of the hub portion 19 is provided with a bore 20 projecting axially inward to rotatably receive the extension 12' on the driven member 10 in a manner to afford relative angular movement about the axis of the hub portions. The drive member 17 is likewise provided with a pair of integral lugs 21 and 22, the former projecting outwardly from the hub portion 19 and inwardly from the flange 18 but in this instance terminating at the end of the hub portion 19. The lug 22 is disposed diametrically opposite to the lug 21 but further outward radially in spaced relation to the hub position to provide a slot 23 and projects inwardly from the flange 18 the same distance as the lug 21, their end faces being in a common plane perpendicular to the axis of the hub portion 19. The adjacent end faces of the lugs on both members abut and normally are in longitudinal alignment, the adjacent lugs 14 and 21 being of the same shape and contour, preferably, their outer ends arcuately curved at 23' by a radius the center of which is on the axis of the hub portions and straight perpendicular sides 24 the inner portions of which terminate in tool grooves. The adjacent lugs 15 and 22 are likewise of the same shape and contour, preferably, their inner ends arcuately curved at 26 by a radius the center of which is on the axis of the hub portions and straight perpendicular sides 27 as more clearly shown in Figures 2 and 3.

A tubular enclosure member 100 is positioned in encircling relation about the hub positions and lugs and has one end in abutment with the inner marginal portion of the flange 11 to prevent movement in one direction. The other end of the member 100 extends snugly over the outer peripheral wall of the drive flange 18 and has an inwardly projecting circular flange 101 mounted for oscillatory movement in a similarly shaped circular recess 102 provided in the outer marginal face of the flange 18. To secure the elements in assembled relation the tubular member 100 has, at its end opposite the flange 101, an annular projection 103 tightly fitting over the adjacent peripheral wall of the flange 11 and its extreme outer end spun over at 104 in rigid engagement with the flange 11 as more clearly shown in Fig. 1.

The drive member 17 is further provided with relatively short integral extensions 28 projecting axially outwardly from the flange 18 terminating in a pinion 29 of suitable diameter. Adjacent the inner end of the pinion a shear portion 30 is provided in any suitable manner but preferably by forming a peripheral groove of reduced cross sectional area to afford a breaking point in the event of mechanical overload in the system. The pinion 29 is adapted for driving connection with any suitable power source such as the aircraft engine or the like. A pump shaft, not shown, has an end adapted to project into the splined opening 13 of the driven member 10 and is suitably connected for unitary movement.

Any suitable means for effecting a flexible drive between the drive member 17 and the driven member 10 may be adopted but a simple and highly efficient means comprises the use of springs so disposed relatively that a balancing of the load is thereby effected as more clearly shown in the figures. An inner resilient element, made of stainless spring steel material, preferably comprises a pair of looped spring members 32 and 33 arranged relatively in concentric relation and having free ends spaced apart relatively. The spring members 32 and 33 are made of thin flat material of substantially equal thickness and formed to tightly encircle the hub portions 12 and 19 the free ends being engageable with the adjacent straight sides 24 of the lugs 14 and 21. The spring members 32 and 33 are sufficiently long to extend from flange 11 to flange 18 and diametrically opposite the free ends, the spring members project through the aligned slots 16 and 23 the outer peripheral portion, adjacent the lugs 15 and 22, resting in the curved upper surface of the latter.

An outer resilient element is substantially similar to the inner element and preferably comprises a pair of looped spring members 37 and 38 arranged relatively in concentric relation and having free ends spaced apart relatively. The spring members 37 and 38 are made of thin flat material of substantially equal thickness, and formed to tightly encircle the adjacent spring member 33, the free ends being engageable with the adjacent straight sides 27 of the lugs 15 and 22. The spring members 37 and 38 are coextensive in length with the spring members 32 and 33 and diametrically opposite the free ends, the spring members project through the space provided between the outer faces 23' of the lugs 14 and 21 and the adjacent inner peripheral wall of the tubular member 100, the inner peripheral portion adjacent the lugs 14 and 21 resting on the curved upper surfaces 23' of the latter.

Figure 2:
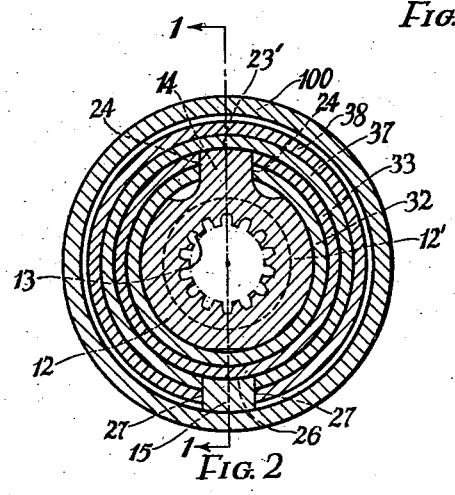
Figure 2 is a transverse sectional view taken substantially along line 2—2 in Figure 1 and showing the normal relationship between the driven member and resilient means.
Figure 3:
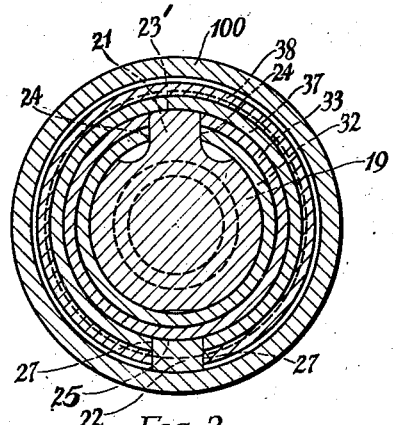
Figure 3 is a transverse sectional view taken substantially along line 3—3 in Figure 1 and showing the normal relationship between the drive member and resilient means.

In the operation of the coupling with the elements in their relative positions as shown in the drawings and assuming the drive member 17 to be stationary, angular movement of the driven member 10, in a counter-clockwise direction as viewed in Figure 2, causes the lug 14 to be moved toward the left which movement in turn is flexibly resisted by the adjacent free ends of the springs 32 and 33. The other free ends of the springs 32 and 33 are prevented from following the lug 14 by their abutment with the opposite side of the lug 21 on the drive member 17. The resiliency of the springs affords a flexible driving connection and if only one such resilient element were provided an unbalanced drive would result which would cause excessive wear. Simultaneously with the afore-mentioned angular movement of the driven member 10, the diametrically opposite lug 15 is moved toward the right which movement is also flexibly resisted by the adjacent free ends of the outer springs 37 and 38. The other free ends of the springs 37 and 38 are prevented from following the lug 15 by their abutment with the opposite side of the lug 22 on the drive member 17. The resiliency of the springs 37 and 38 affords a flexible driving connection and by providing these additional cooperating lugs and springs arranged diametrically opposite for operation, a flexible balanced drive is provided between the drive member and driven member. It should be noted also that the same flexible drive is afforded when the driven member 10 is moved angularly in a clockwise direction about its axis.

The balanced load effect is obtained in the following manner; when the inner springs and outer springs are made of the same thickness of material it will be seen that the outer springs will be softer than the inner springs, due to their greater diameter. A correspondingly lesser pressure is therefore, exerted on the outer lugs, and a correspondingly lesser force, due to the greater radius, is necessary to maintain a balanced load on the drive and driven members.

In the preferred arrangement shown in the drawings, two springs for each element are used, but a single spring or more than two may be employed without departing from the invention. It is to be further noted that the coupling will work with equal efficiency if the driven member 10 becomes the drive member 17. The springs may be pre-loaded slightly if the requirements necessitate.

While I have described the preferred embodiment of the invention it is to be understood that I am not to be limited thereto inasmuch as changes and modifications may be resorted to without departing from the spirit of the invention as defined in the appended claims.

What is claimed is:

1. A flexible coupling comprising; a rotatable drive member; a rotatable driven member adapted for unitary rotation in the same direction with said drive member; said members having a limited amount of relative angular movement about their axis of rotation; and a flexible means operatively connecting said members together for unitary rotation including, a pair of endwise opposed lugs one on each member projecting outwardly on one side of their axis; a second pair of endwise opposed lugs one on each member positioned outwardly on the opposite side of their axis, the second lugs being disposed farther outward radially than the first mentioned lugs; an outer looped spring member having free ends engageable with the adjacent sides of both second mentioned lugs; and an inner looped spring member nested in and against said outer looped spring member and against said second mentioned lugs at its middle and having free ends engageable with the sides of both first mentioned lugs, whereby the load on the drive and driven members is balanced.

2. A flexible coupling comprising; a rotatable drive member; a rotatable driven member adapted for unitary rotation in the same direction with said drive member; said members having a limited amount of relative angular movement about their axis of rotation; means for maintaining said members in alignment including apposed hub portions having telescoping interengagement; and a flexible means operatively connecting said members together for unitary rotation including, a pair of endwise opposed lugs one on each member projecting outwardly on one side of their axis, a second pair of endwise opposed lugs one on each member positioned outwardly on the opposite side of their axis, the second lugs being disposed farther outward radially than the first mentioned lugs; an inner looped spring member encircling said members and having free ends engageable with the adjacent sides of both first mentioned lugs to afford a flexible driving connection between said members on one side thereof; and an outer looped spring member encircling said inner looped spring member and having free ends engageable with the adjacent sides of both second mentioned lugs to afford a flexible driving connection between said members on the opposite side thereof whereby the load on the drive and driven members is balanced, the end walls at the free ends of the lugs being arcuately curved to conform to the curvature of the adjacent spring members with which they engage.

3. A flexible coupling comprising; a rotatable drive member; a rotatable driven member adapted for unitary rotation in the same direction with said drive member; said members having a limited amount of relative angular movement about their axis of rotation; and a flexible means operatively connecting said members together for unitary rotation including, a pair of endwise opposed lugs one on each member projecting outwardly on one side of their axis, a second pair of endwise opposed lugs one on each member positioned outwardly on the opposite side of their axis, the second lugs being disposed farther outward radially than the first mentioned lugs; a pair of concentrically arranged outer looped spring members, of substantially the same thickness; and a pair of concentric inner looped spring members, of substantially the same thickness, nested in and against said outer looped spring members and against said second mentioned lugs and having free ends engageable with the sides of both first mentioned lugs.

4. A flexible coupling comprising; a driven member having a circular flange at its outer end and a centrally disposed hub portion projecting axially inward from its flange; said driven member being further provided with an integral lug projecting outwardly at one side from its hub portion and inwardly from its flange, terminating short of the free end of its hub portion, said driven member being further provided with a second integral lug projecting inwardly from its flange in spaced relation to its hub portion and disposed on the opposite side from its first lug but farther outward radially; a drive member having a circular flange at its outer end and a centrally disposed hub portion projecting axially inwardly from its flange, the inner end of its hub portion being provided with an axial bore to rotatably receive the adjacent free end of said driven hub portion, said drive member being further provided with an integral lug projecting outwardly at one side from its hub portion and inwardly from its flange, the lug being normally endwise opposed to the first lug on said driven member, said drive member being further provided with a second integral lug projecting inwardly from its flange in spaced relation to its hub portion and disposed on the opposite side from its first lug but farther outward radially, the second lugs on both members being normally endwise opposed, said drive member having a pinion projecting outward axially from its flange; an inner looped spring member encircling said hub portions and having free ends engageable with the adjacent sides of both first mentioned lugs to afford a flexible driving connection between said drive and driven members on one side thereof; an outer looped spring member encircling said inner looped spring member and having free ends engageable with the adjacent sides of both second mentioned lugs to afford a flexible driving connection between said drive and driven members on the opposite side thereof whereby the load on the drive and driven members is balanced; and a tubular enclosure member extending between the flanges and having one end rigidly secured to the adjacent flange, the other end being operably connected to the adjacent flange to afford relative oscillatory movement.

JAMES P. JOHNSON.

REFERENCES CITED

The following references are of record in the file of this patent:

UNITED STATES PATENTS

| Number | Name | Date |
|---|---|---|
| 1,673,959 | Wallgren | June 19, 1928 |
| 1,841,255 | Rybeck | Jan. 12, 1932 |
| 1,952,564 | Prins | Mar. 27, 1934 |
| 2,263,113 | Wichorek et al. | Nov. 18, 1941 |

FOREIGN PATENTS

| Number | Country | Date |
|---|---|---|
| 423,278 | Great Britain | Jan. 29, 1935 |